(12) United States Patent
Feng et al.

(10) Patent No.: US 11,693,531 B2
(45) Date of Patent: Jul. 4, 2023

(54) PAGE DISPLAY POSITION JUMP METHOD AND APPARATUS, TERMINAL DEVICE, AND STORAGE MEDIUM

(71) Applicant: BEIJING BYTEDANCE NETWORK TECHNOLOGY CO., LTD., Beijing (CN)

(72) Inventors: Mengluo Feng, Beijing (CN); Xiaomeng Yu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/298,069

(22) PCT Filed: Nov. 18, 2019

(86) PCT No.: PCT/CN2019/119187
§ 371 (c)(1),
(2) Date: May 28, 2021

(87) PCT Pub. No.: WO2020/108339
PCT Pub. Date: Jun. 4, 2020

(65) Prior Publication Data
US 2022/0050559 A1 Feb. 17, 2022

(30) Foreign Application Priority Data
Nov. 29, 2018 (CN) .......................... 201811446857.0

(51) Int. Cl.
*G06F 3/0482* (2013.01)
*G06F 3/0484* (2022.01)
*G06F 3/16* (2006.01)

(52) U.S. Cl.
CPC .......... *G06F 3/0482* (2013.01); *G06F 3/0484* (2013.01); *G06F 3/165* (2013.01); *G06F 2203/04803* (2013.01)

(58) Field of Classification Search
CPC ...... G06F 3/0482; G06F 3/0484; G06F 3/165; G06F 2203/04803; G06F 16/955; G06F 16/957; G06F 16/958
See application file for complete search history.

(56) References Cited

U.S. PATENT DOCUMENTS 5,506,951 A * 4/1996 Ishikawa ............. G06F 3/04855
715/777
6,778,192 B2 * 8/2004 Arbab ................. G06F 3/04855
715/833
(Continued)

FOREIGN PATENT DOCUMENTS

CN 101796476 A 8/2010
CN 101996048 A 3/2011
(Continued)

OTHER PUBLICATIONS

ITunes for Beginners by Hannah Williams, retrieved from—https://computers.tutsplus.com/tutorials/itunes-for-beginners--mac-55682, Nov. 5, 2013, 17 pages (Year: 2013).*
(Continued)

*Primary Examiner* — Yongjia Pan

(57) ABSTRACT

Embodiments of the present disclosure provide a method and an apparatus for jumping a page display location, a terminal device and a storage medium. The method includes: displaying a multimedia playlist on a page, the multimedia playlist including multiple multimedia items; initiating to play the multimedia items in the multimedia playlist according to a preset playing trigger condition; acquiring a location jump request; determining a currently playing multimedia item in the multimedia playlist, wherein the currently play- (Continued)

ing multimedia item is one multimedia item in the multimedia playlist; and jumping the page display location to a location of the currently playing multimedia item in the multimedia playlist. The embodiments of the present disclosure enable the page quickly jump to the location of the currently playing multimedia item when the user views the multimedia information, thereby improving the user experience.

13 Claims, 7 Drawing Sheets

(56) References Cited

U.S. PATENT DOCUMENTS

| | | | |
|---|---|---|---|
| 2006/0269230 A1* | 11/2006 | Cho | G11B 27/105 386/327 |
| 2010/0328224 A1* | 12/2010 | Kerr | G06F 3/04886 345/173 |
| 2012/0087637 A1 | 4/2012 | Logan et al. | |
| 2012/0192108 A1* | 7/2012 | Kolb | G06F 3/0482 715/810 |
| 2012/0232681 A1 | 9/2012 | Mundy et al. | |
| 2013/0007617 A1* | 1/2013 | Mackenzie | G06F 16/40 715/716 |
| 2014/0075308 A1* | 3/2014 | Sanders | G06F 3/165 715/716 |
| 2015/0193111 A1* | 7/2015 | Kauffmann | G06F 3/017 715/825 |
| 2015/0248272 A1* | 9/2015 | Saeki | G06F 3/165 700/94 |
| 2015/0277737 A1* | 10/2015 | Coburn, IV | G11B 27/329 715/716 |
| 2015/0309689 A1* | 10/2015 | Jin | G06F 3/0486 715/765 |
| 2016/0103606 A1* | 4/2016 | Huang | G06F 3/0482 345/173 |
| 2016/0334952 A1 | 11/2016 | Jia | |
| 2017/0024119 A1* | 1/2017 | Wild | B60K 37/06 |
| 2019/0025993 A1* | 1/2019 | Sanders | G06F 3/0482 |

FOREIGN PATENT DOCUMENTS

| | | | | |
|---|---|---|---|---|
| CN | 105022552 A | | 11/2015 | |
| CN | 105830454 A | | 8/2016 | |
| CN | 106227459 A | | 12/2016 | |
| CN | 106231405 A | | 12/2016 | |
| CN | 106610770 A | | 5/2017 | |
| CN | 106775272 A | | 5/2017 | |
| CN | 106851377 A | | 6/2017 | |
| CN | 107678810 A | | 2/2018 | |
| CN | 107766548 A | | 3/2018 | |
| CN | 108668172 A | | 10/2018 | |
| CN | 109582893 A | | 4/2019 | |
| CN | 105898573 B | * | 12/2019 | G06F 3/0482 |
| EP | 2784645 A2 | * | 10/2014 | G06F 21/31 |

OTHER PUBLICATIONS

Why isn't the current song that's playing highlighted?, retrieved from—https://discussions.apple.com/thread/6778848, Jan. 15, 2015, 2 pages (Year: 2015).*
Shortkey to jump to the current playing song, retrieved from—https://www.mediamonkey.com/forum/viewtopic.php?t=26722, Feb. 26, 2008, 5 pages (Year: 2008).*
Jump to currently playing track in a playlist, retrieved from—http://forums.winamp.com/showthread.php?t=362875, Jun. 3, 2013, 2 pages (Year: 2013).*
Keyboard Shortcuts for iTunes!, retrieved from—https://www.youtube.com/watch?v=cV2cOQ11I-UU, Mar. 9, 2015, 3 pages (Year: 2015).*
Chinese Patent Application No. 201811446857.0, Notification of Rejection dated Sep. 3, 2021, 9 pages.
Chen, Hongbo (2018) "Novice computer learner" Basic knowledge of computer IV, with Machine Generated English Translation.
Chinese Patent Application No. 201811446857.0, First Office Action dated Mar. 31, 2020, 11 pages.
PCT Application No. PCT/CN2019/119187, International Search Report dated Feb. 19, 2020, 4 pages.
Chinese Patent Application No. 201811446857.0, Second Office Action dated Nov. 26, 2020, 10 pages.
Chinese Patent Application No. 201811446857.0, Third Office Action dated May 27, 2021, 10 pages.
The Fourth Office Action dated Apr. 6, 2022 in Chinese Patent Application No. 201811446857.0 (11 pages) with an English translation (12 pages).
Decision of Rejection dated Jul. 4, 2022 for CN Application No. 201811446857.0, with English translation (13 pages).

* cited by examiner

PAGE DISPLAY POSITION JUMP METHOD AND APPARATUS, TERMINAL DEVICE, AND STORAGE MEDIUM

CROSS-REFERENCE TO RELATED APPLICATION

This application is a U.S. 371 Application of International Patent Application No. PCT/CN2019/119187, filed on 18 Nov. 2019, which application claims the priority of Chinese Patent Application No. 201811446857.0 filed on Nov. 29, 2018, the disclosures of which are incorporated by reference herein in their entireties.

TECHNICAL FIELD

The disclosure relates to the field of multimedia information processing technology, and in particular to a method and an apparatus for jumping a page display location, a terminal device and a storage medium.

BACKGROUND

With the development of Internet and smart terminals, various multimedia information has enriched the lives, work and entertainment of users.

In related technologies, multimedia information applications (APP) usually display multimedia information to users in the form of multimedia playlist. Users can view multimedia information by flipping through the multimedia playlist, but when there is too much multimedia information, it will spend too much time to flip through, which affects the user experience.

SUMMARY

According to a first aspect of the present disclosure, a method for jumping a page display location is provided, comprising:

displaying a multimedia playlist on a page, the multimedia playlist including multiple multimedia items;

initiating to play the multimedia items in the multimedia playlist according to a preset playing trigger condition;

acquiring a location jump request;

determining a currently playing multimedia item in the multimedia playlist, wherein the currently playing multimedia item is one multimedia item in the multimedia playlist; and jumping the page display location to a location of the currently playing multimedia item in the multimedia playlist.

Optionally, after initiating to play the multimedia items in the multimedia playlist, the method for jumping a page display location further includes: tagging a multimedia item initiated to be played as the currently playing multimedia item, and the determining the currently playing multimedia item in the multimedia playlist comprises: determining the currently playing multimedia item according to whether each multimedia item in the multimedia playlist is tagged.

Optionally, the tagging the multimedia item initiated to be played includes: modifying a value of a status tag bit of the multimedia item initiated to be played to tag the multimedia item initiated to be played; or recording identification information of the multimedia item initiated to be played to tag the multimedia item initiated to be played.

Optionally, a location jump button is provided on the page, and the acquiring the location jump request includes:

receiving a trigger operation of a user on the location jump button; and generating the location jump request.

Optionally, the method for jumping a page display location includes:

Optionally, the adjusting the location jump button according to the display content on the page includes:

detecting an effective content area of the display content on the page, and setting the location jump button in an area that does not overlap with the effective content area;

detecting the effective content area of the display content on the page, and adjusting the shape of the location jump button so that the location jump button does not overlap with the effective content area; or adjusting the color of the location jump button according to the display content on the page.

Optionally, the method for jumping a page display location includes: displaying the location jump button on the page when a preset trigger operation of the user is detected.

Optionally, the preset trigger operation comprises one of up-sliding, down-sliding, left-sliding or right-sliding.

According to a second aspect of the present disclosure, an apparatus for jumping a page display location is provided, comprising:

a display module, configured to display a multimedia playlist on a page, the multimedia playlist including multiple multimedia items;

a playing module, configured to initiate to play the multimedia items in the multimedia playlist according to a preset playing trigger condition;

an acquisition module, configured to acquire a location jump request;

a determination module, configured to determine a currently playing multimedia item in the multimedia playlist, wherein the currently playing multimedia item is one multimedia item in the multimedia playlist; and a jump module, configured to jump the page display location to a location of the currently playing multimedia item in the multimedia playlist.

Optionally, the apparatus for jumping a page display location further includes:

a tag module, configured to tag a multimedia item initiated to be played as the currently playing multimedia item after initiating, by the playing module, to play the multimedia item in the multimedia playlist; and a determination module, configured to determine the currently playing multimedia item according to whether each multimedia item in the multimedia playlist is tagged.

Optionally, the tag module is configured to modify a value of a status tag bit of the multimedia item initiated to be played to tag the multimedia item initiated to be played; or record identification information of the multimedia item initiated to be played to tag the multimedia item initiated to be played.

Optionally, a location jump button is provided on the page, and the acquisition module is further configured to receive a trigger operation of the user on the location jump button; and generate the location jump request.

Optionally, the apparatus for jumping a page display location further includes: an adjusting module, configured to set a location jump button at a fixed location on the page, or adjust the location jump button according to a display content on the page.

Optionally, the adjusting module is configured to: detect an effective content area of the display content on the page, set the location jump button in an area that does not overlap with the effective content area; or detect the effective content area of the display content on the page, adjust the shape of the location jump button so that the location jump button does not overlap with the effective content area; or adjust the color of the location jump button according to the display content on the page.

Optionally, the display module is further configured to display the location jump button on the page when a preset trigger operation of the user is detected.

Optionally, the preset trigger operation includes one of up-sliding, down-sliding, left-sliding or right-sliding.

According to a third aspect of the present disclosure, a terminal device is provided, comprising: one or more processors; and a memory, configure to store one or more programs that, when executed by the one or more processors, causes the one or more processors to implement any of the methods for jumping a page display location according to the first aspect of the present disclosure.

According to a fourth aspect of the present disclosure, a computer-readable storage medium is also provided, on which a computer program is stored that, when executed by a processor, to implement any of the methods for jumping a page display location according to the first aspect of the present disclosure.

DETAILED DESCRIPTION

The present disclosure will be further described in detail below with reference to the accompanying drawings and embodiments. It can be understood that the specific embodiments described herein are only used to explain the present disclosure, but not to limit the present disclosure. In addition, it should be noted that, for ease of description, only a part of the structure related to the present disclosure is shown in the accompanying drawings, but not all of the structure.

It should be noted that the terms "system" and "network" in the present disclosure are often used interchangeably in this disclosure. The "and/or" mentioned in the embodiments of the present disclosure means including any of and all combinations of one or more related listed items. The terms "first", "second" and the like in the specification, claims and drawings of the present disclosure are used to distinguish different objects, but not to limit a specific order.

It should also be noted that the following various embodiments of the present disclosure can be implemented individually, and the various embodiments can also be combined with each other for implementation, and the embodiments of the present disclosure do not specifically limit this.

The embodiments of the present disclosure provide a method and an apparatus for jumping a page display location, a terminal device and a storage medium, which enable the page quickly jump to the location of the currently playing multimedia item when a user views the multimedia item, thereby improving the user experience.

The embodiments of the present disclosure are applicable to application scenarios of multimedia information playing. The scenario may include: a terminal device (such as a smart TV, a mobile phone application, etc.) that can play multimedia information or control other apparatuses to play multimedia information, or a server. Wherein, the server may include an application server that provides support for terminal devices and/or a storage server that stores multimedia playlist and multimedia information resources. The storage server provides service interfaces for the application server, so that the application server can respond to various instructions input by the user through the terminal device. For example, the storage server stores various multimedia item resources, and the storage server provides service interfaces for the application server. When the application server receives instructions playing the multimedia item input by the user through the terminal device, the application server can request the multimedia item resources from the storage server and transmit the multimedia item resources to the terminal device. In practical applications, the storage server and the application server may be integrated in one server device, or may be respectively set in different server devices, which is not specifically limited in the embodiment of the present disclosure.

Figure 1:
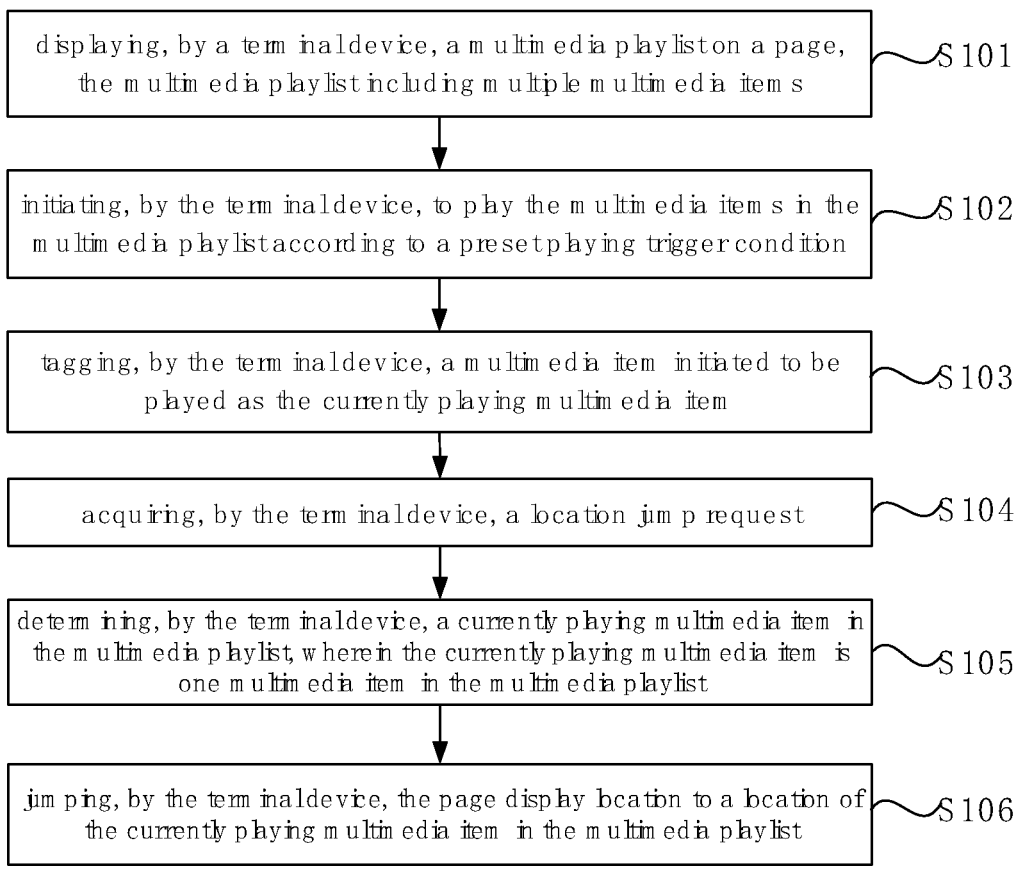
FIG. 1 is a schematic flowchart of a method for jumping a page display location according to an embodiment of the present disclosure.

FIG. 1 is a schematic flowchart of a method for jumping a page display location according to an embodiment of the present disclosure. The method disclosed in the embodiment of the present disclosure is mainly applicable to terminal devices. Specifically, it can be implemented by installing an application program on the terminal device. As shown in FIG. 1, the method specifically includes the following steps.

S101: displaying, by a terminal device, a multimedia playlist on a page, the multimedia playlist including multiple multimedia items.

It can be understood that the terminal device in this step can be a smart phone, or any terminal device with a multimedia information playing function such as a laptop or tablet computer, or a terminal device that can control other multimedia information playing devices to play multimedia information. Wherein, the multimedia information may include any one of audio information and video information.

Specifically, the terminal device can display the multimedia playlist on a playing window of the page, and the playing window can be located at the top, bottom, left, right, or middle of the page; the terminal device can also display the multimedia playlist on the full screen of the page. The embodiment of disclosure does not specifically limit this.

In addition, the multiple multimedia items included in the multimedia playlist may be the same type of multimedia items or different types of multimedia items.

S102: initiating, by the terminal device, to play the multimedia items in the multimedia playlist according to a preset playing trigger condition.

It can be understood that the method for the terminal device in this step to initiate to play the multimedia items in the multimedia playlist according to the preset playing trigger condition may at least include any one of the followings.

Scenario 1: the terminal device initiates to play the multimedia items in the multimedia playlist according to trigger operations such as voice and gesture.

In one or more embodiments of the present disclosure, the user may make a trigger operation through an external input device or touching the display screen of a terminal device.

Scenario 2: the terminal device initiates to play the multimedia items in the multimedia playlist according to a preset playing order.

In one or more embodiments of the present disclosure, the preset order may be the arrangement order of the multimedia playlist, or the priority order of the multimedia items, or the like. The priority order may be arranged in the order of priority from high to low, or may be arranged in the order of priority from low to high, or in a random order, which is not specifically limited in the embodiments of the present disclosure.

S103: tagging, by the terminal device, a multimedia item initiated to be played as the currently playing multimedia item.

In one or more embodiments of the present disclosure, the method for tagging, by the terminal device, the multimedia item initiated to be played as the currently playing multimedia item may also include at least any one of the followings.

Scenario 3: the terminal device modifies a value of a status tag bit of the multimedia item initiated to be played to tag the multimedia item initiated to be played.

The scenario 3 is generally applicable to a scenario where there is a status list of multimedia items, and the status list includes the status flag bits of each multimedia item.

As an example, it is taken as an example that the status flag bit of the multimedia item is "0" or "1". When the status flag bit of the multimedia item is "0", it means that the multimedia item is not the currently playing multimedia item; when the status flag bit of the multimedia item is "1", it means that the multimedia item is the currently playing multimedia item. Therefore, the step of the terminal device tagging the multimedia item initiated to be played is that the terminal device modifies the value of the status flag bit of the multimedia item initiated to be played from "0" to "1" to tag the multimedia item initiated to be played. Of course, when the status flag bit of the multimedia item is "0", it can indicate that the multimedia item is the currently playing multimedia item; when the status flag bit of the multimedia item is "1", it can also indicate that the multimedia item is not the currently playing multimedia item. The embodiments of the present disclosure do not specifically limit this.

Scenario 4: the terminal device records identification information of the multimedia item initiated to be played to tag the multimedia item initiated to be played.

The scenario 4 may be applicable to a scenario where a storage area is separately set, and the storage area is used to store identification information of the multimedia item initiated to be played.

Since the identification information of the multimedia item is unique, the terminal device can tag the multimedia item initiated to be played, as long as it records the identification information of the multimedia item initiated to be played.

S104: acquiring, by the terminal device, a location jump request.

The location jump request acquired by the terminal device in this step may be triggered by the user based on a location jump button set on the page, or may be triggered by a shortcut gesture input by the user, which is not specifically limited in the embodiment of the present disclosure.

Hereinafter, a detailed description will be given by taking an example in which the location jump request acquired by the terminal device is triggered by the user based on the location jump button set on the page.

In one or more embodiments of the present disclosure, a location jump button is provided on the page, and the location jump button can be set at a fixed location on the page, or the location jump button can be adjusted according to the display content on the page.

Wherein, the location jump button can be adjusted according to the display content on the page and can include any of the followings.

(1) The terminal device detects an effective content area of the display content on the page, and sets the location jump button in an area that does not overlap with the effective content area.

(2) The terminal device detects the effective content area of the display content on the page, and adjusts the shape of the location jump button so that the location jump button does not overlap with the effective content area.

Wherein, the shape of the location jump button can be a circle, a rectangle, a polygon, or various shapes that can adapt to the effective content area of the display content.

(3) The terminal device adjusts the color of the location jump button according to the display content on the page.

Wherein, the terminal device can set a location jump button outside the effective content area of the display content on the page according to the display content on the page, and adjust the color of the location jump button, so that the location jump button can be clearly recognized by the user; or, the terminal device can set the location jump button in the effective content area of the display content according to the display content on the page, and the layer of the location jump button is above the layer of the display content, and the color of the location jump button can be transparent, translucent or opaque.

Figure 2:
FIG. 2 is a schematic diagram of a terminal device screen according to an embodiment of the present disclosure.

FIG. 2 is a schematic diagram of a terminal device screen according to an embodiment of the present disclosure. It can be seen from FIG. 2 that the screen page of the terminal device can be divided into two areas, the upper and lower areas, and the first song is being played in the upper area, and a multimedia playlist including the first song, the second song, . . . , and the $N^{th}$ song is displayed in the lower area. The user can skip through multiple multimedia items in the multimedia playlist by performing up-sliding, down-sliding in the lower area. At this time, the location jump button is displayed in a fixed position (for example, any of up, down, left, and right side or multiple sides) on the page. Wherein, FIG. 2 is drawn with the jump button corresponding to the position of the black dot on the right lower side as an example. If the user clicks the location jump button, the terminal device receives the trigger operation by the user for the location jump button and generates a location jump request. The terminal device continues to perform the following steps S105 and S106 to jump the page display location in the lower area to a location of the first song currently being played in the multimedia playlist. If the user does not click the location jump button, the terminal device does not require to continue to perform the following steps S105 and S106.

Figure 3:
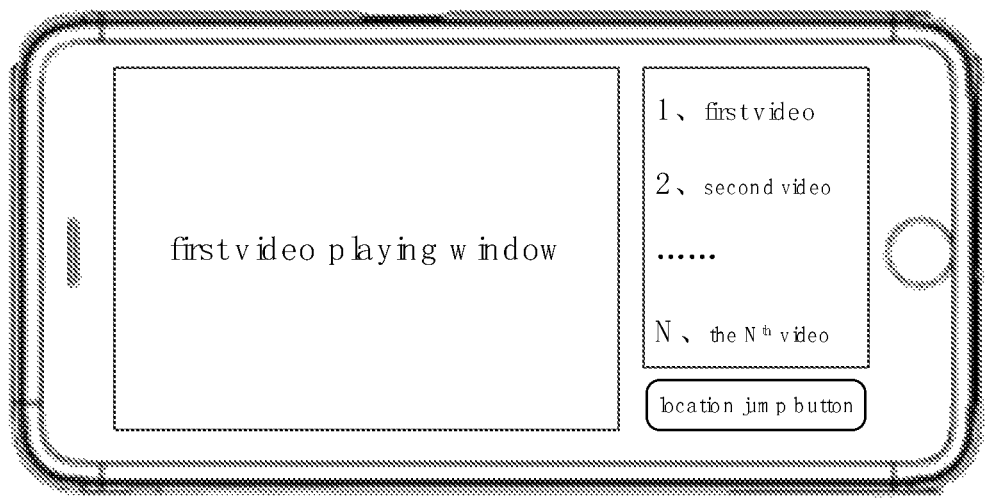
FIG. 3 is a schematic diagram of another terminal device screen according to an embodiment of the present disclosure.

FIG. 3 is a schematic diagram of another terminal device screen according to an embodiment of the disclosure. It can be seen from FIG. 3 that the screen page of the terminal device can be divided into two areas, the left and right areas, and the left area is a video playing window, the video playing window is playing the first video, and the right area displays a multimedia playlist including the first video, the second video, . . . , the $N^{th}$ video.

As shown in FIG. 3, the location jump button displayed on the right side of the video playing window and below the multimedia playlist is token as an example. If the user clicks the location jump button, the terminal device receives the trigger operation by the user for the location jump button and generates a location jump request. The terminal device continues to perform the following steps S105 and S106 to jump the page display location in the right area to a location of the first song currently being played in the multimedia playlist. If the user does not click the location jump button, the terminal device does not require to continue to perform the following steps S105 and S106.

In addition, in the embodiments shown in FIGS. 2 and 3, the user can skip through multiple multimedia items in the multimedia playlist through sliding operations in a preset direction, such as up-sliding, down-sliding. Meanwhile, the terminal device can detect the effective content area of the display content on the page, and set the location jump button in an area that does not overlap the effective content area. The effective display content may include effective information such as the names of multimedia items in the multimedia playlist.

In addition, it should be noted that the terminal device acquires the location jump request in step S104, the location jump request may be input by the user through voice, or input by the user through a predetermined gesture, which is not specifically limited in the embodiment of the present disclosure.

S105: determining, by the terminal device, a currently playing multimedia item in the multimedia playlist, wherein the currently playing multimedia item is one multimedia item in the multimedia playlist.

In one or more embodiments of the present disclosure, corresponding to the above step S103, the method for determining, by the terminal device, a currently playing multimedia item in the multimedia playlist may be: the terminal device determines the currently playing multimedia item according to whether each multimedia item in the multimedia playlist is tagged.

As an example, corresponding to the scenario 3 above, the terminal device may traverse all multimedia items in the status list and determine the value of the status flag bit of each multimedia item to determine the currently playing multimedia item.

As another example, corresponding to the scenario 4 above, the terminal device may read the identification information of the multimedia item initiated to be played recorded in the storage area to determine the currently playing multimedia item.

In addition, the present disclosure does not limit the execution order of step S104 and step S105.

S106: jumping, by the terminal device, the page display location to a location of the currently playing multimedia item in the multimedia playlist.

After the terminal device determines the currently playing multimedia item in the multimedia playlist, the terminal device can quickly jump the page display location to the location of the currently playing multimedia item in the multimedia playlist, thereby reducing the reverse operation steps of the user, and then improving the user experience.

Figure 4:
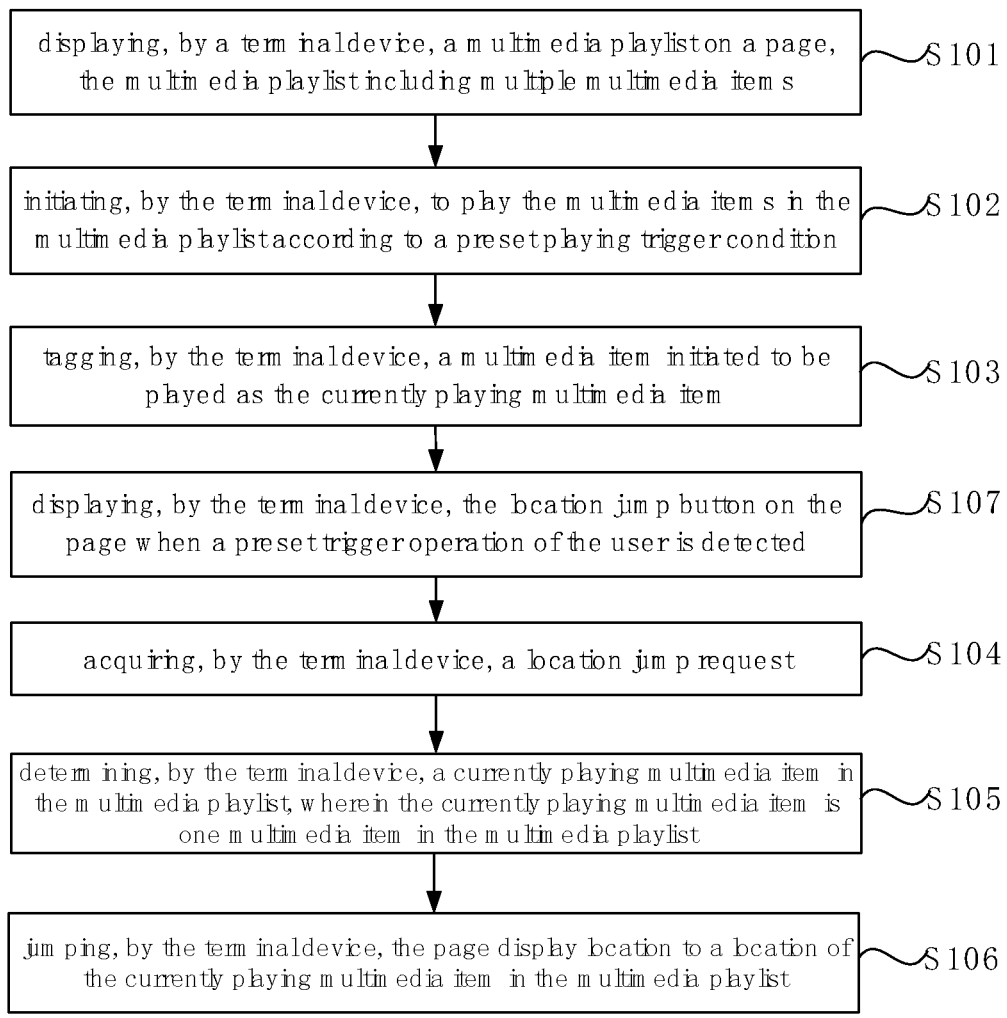
FIG. 4 is a schematic flowchart of another method for jumping a page display location according to an embodiment of the present disclosure.

On the basis of the foregoing embodiments of the present disclosure, in order not to affect the user experience, the location jump button in step S104 can be hidden when the user normally uses the terminal device. FIG. 4 is a schematic flowchart of another method for jumping a page display location according to an embodiment of the present disclosure. As shown in FIG. 4, in addition to the steps S101 to S106 in the above embodiment, before step S104 is executed, the method further includes:

S107: displaying, by the terminal device, the location jump button on the page when a preset trigger operation of the user is detected.

In one or more embodiments of the present disclosure, the preset trigger operation may trigger the movement of the display location of the media item, or trigger the currently played media item to not be within the field of view or within the operable range, for example, the preset trigger operation may be one of up-sliding, down-sliding, left-sliding or right-sliding.

In this way, the location jump button only requires to be displayed when the preset trigger operation of the user is detected, that is, when the user requires to jump the page display location to the location of the currently playing multimedia item in the multimedia playlist, so as to improve the user experience.

The embodiments of the present disclosure provide a method for jumping a page display location, comprising: displaying a multimedia playlist on a page, the multimedia playlist including multiple multimedia items; initiating to play the multimedia items in the multimedia playlist according to a preset playing trigger condition; acquiring a location jump request; determining a currently playing multimedia item in the multimedia playlist, wherein the currently playing multimedia item is one multimedia item in the multimedia playlist; and jumping the page display location to a location of the currently playing multimedia item in the multimedia playlist. By acquiring the location jump request and determining the currently playing multimedia item in the multimedia playlist, so that when the user is viewing the multimedia playlist containing multimedia information, the page quickly jumps to the location of the currently playing multimedia item, overcomes the following problem: when the multimedia playlist is too long, the user requires too much time to flip through the multimedia playlist in a reverse order upon returning to the currently playing multimedia item, which saves the operation steps of the user and improves the user experience.

Figure 5:
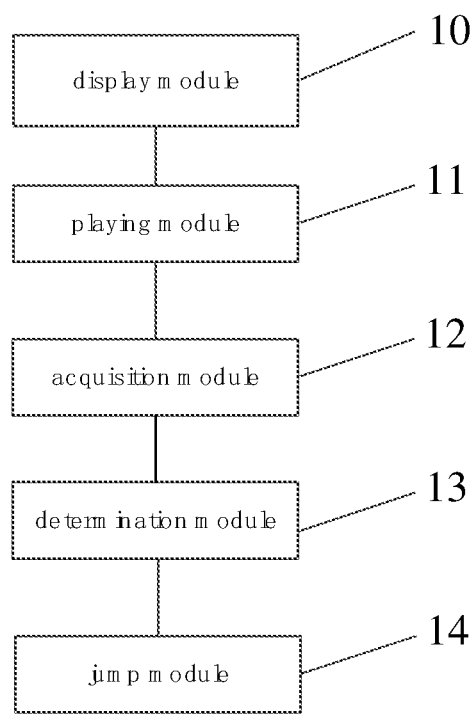
FIG. 5 is a schematic structural diagram of an apparatus for jumping a page display location according to an embodiment of the present disclosure.

FIG. 5 is a schematic structural diagram of an apparatus for jumping a page display location according to an embodiment of the present disclosure. Specifically, the apparatus for jumping a page display location may be configured in a terminal device, and includes: a display module 10, a playing module 11, an acquisition module 12, a determination module 13, and a jump module 14. The display module 10 is configured to display a multimedia playlist on a page, and the multimedia playlist includes multiple multimedia items.

The playing module 11 is configured to initiate to play the multimedia items in the multimedia playlist according to a preset playing trigger condition.

The acquisition module 12 is configured to acquire a location jump request.

The determination module 13 is configured to determine a currently playing multimedia item in the multimedia playlist, wherein the currently playing multimedia item is one multimedia item in the multimedia playlist.

The jump module 14 is configured to jump the page display location to a location of the currently playing multimedia item in the multimedia playlist.

Figure 6:
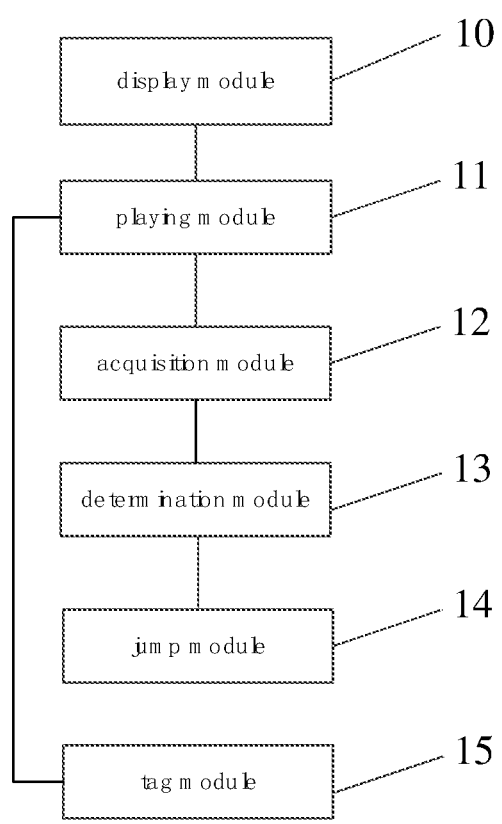
FIG. 6 is a schematic structural diagram of another apparatus for jumping a page display location according to an embodiment of the present disclosure.

Optionally, in conjunction with FIG. 5, FIG. 6 is a schematic structural diagram of another apparatus for jumping a page display location according to an embodiment of the present disclosure, which further comprising a tag module 15.

The tag module 15 is configured to tag a multimedia item initiated to be played as the currently playing multimedia item after initiating, by the playing module 11, to play the multimedia item in the multimedia playlist.

The determination module 13 is further configured to determine the currently playing multimedia item according to whether each multimedia item in the multimedia playlist is tagged.

Optionally, the tag module 15 is configured to modify a value of a status tag bit of the multimedia item initiated to be played to tag the multimedia item initiated to be played; or record identification information of the multimedia item initiated to be played to tag the multimedia item initiated to be played.

Optionally, a location jump button is provided on the page, and the acquisition module 12 is further configured to receive a trigger operation of the user on the location jump button and generate the location jump request.

Figure 7:
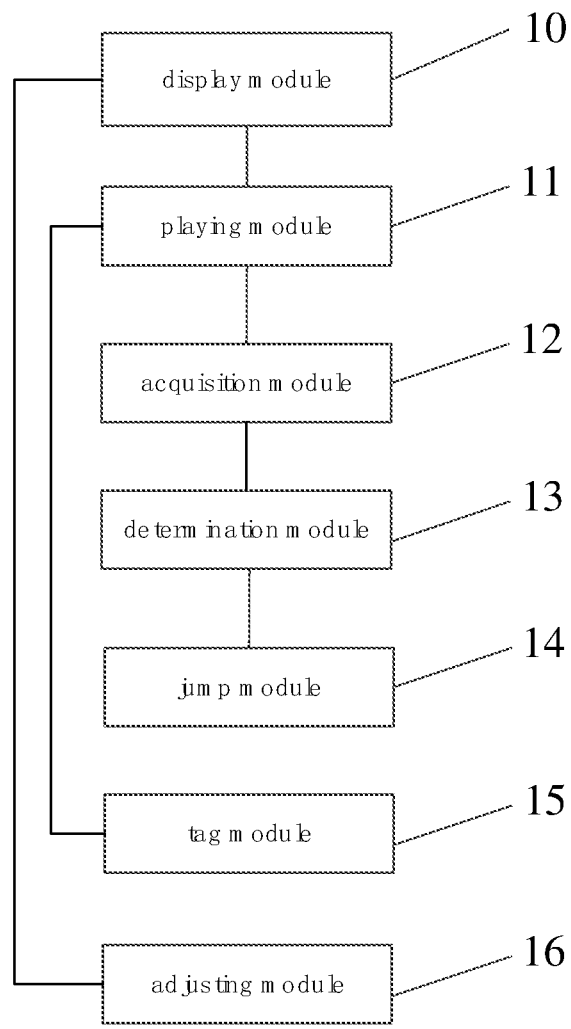
FIG. 7 is a schematic structural diagram of yet another apparatus for jumping a page display location according to an embodiment of the present disclosure.

Optionally, in conjunction with FIG. 6, FIG. 7 is a schematic structural diagram of yet another apparatus for jumping a page display location according to an embodiment of the present disclosure, further comprising: an adjusting module 16, configured to set a location jump button at a fixed location on the page, or adjust the location jump button according to a display content on the page.

Optionally, the adjusting module 16 is configured to: detect an effective content area of the display content on the page, set the location jump button in an area that does not overlap with the effective content area; or detect the effective content area of the display content on the page, adjust the shape of the location jump button so that the location jump button does not overlap with the effective content area; or adjust the color of the location jump button according to the display content on the page.

Optionally, the display module 10 is further configured to display the location jump button on the page when a preset trigger operation of the user is detected.

Optionally, the preset trigger operation includes one of up-sliding, down-sliding down, left-sliding or right-sliding.

The above apparatus for jumping a page display location provided by the embodiment of the present disclosure can execute the steps performed by the terminal device in the method for jumping a page display location provided by the method embodiment of the present disclosure, and has corresponding functional modules and beneficial effects for the execution method.

Figure 8:
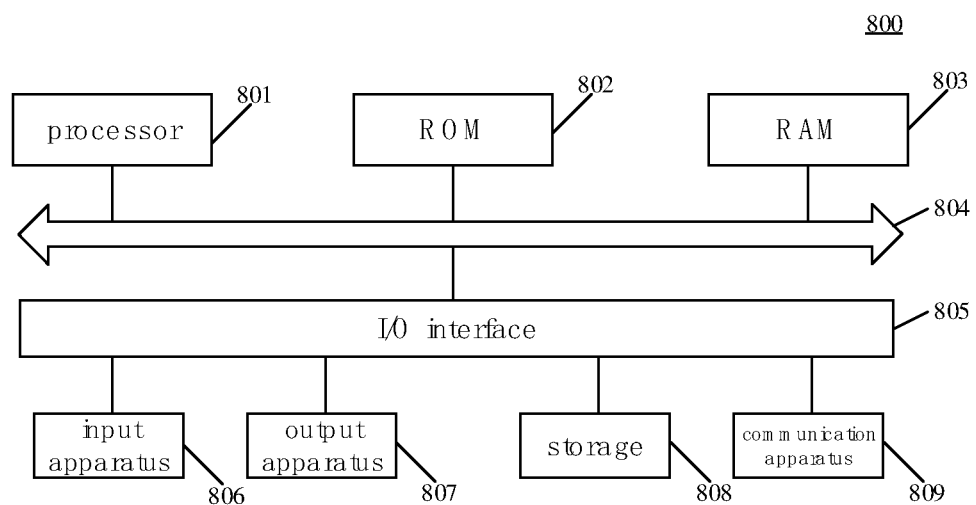
FIG. 8 is a schematic structural diagram of a terminal device according to an embodiment of the present disclosure.

FIG. 8 is a schematic structural diagram of a terminal device according to an embodiment of the present disclosure. As shown in FIG. 8, a schematic structural diagram of a terminal device that is suitable for implementing the embodiments of the present disclosure is illustrated. Taking the terminal device as an example, the terminal device in the embodiment of the present disclosure may include, but is not limited to, a mobile terminal, such as a mobile phone, a notebook computer, a digital broadcast receiver, a personal digital assistant (PDA), a portable android device (PAD), a portable multimedia player (PMP), an on-vehicle terminal (for example, an on-vehicle navigation terminal) and the like, as well as a fixed terminal such as digital TV, a desktop computer and the like. The terminal device shown in the FIG. 8 is merely an example, and then should not construct any limitation on the function and scope of use of the embodiments of the present disclosure.

As shown in FIG. 8, the terminal device 800 may include a processing (e.g., a central processing unit, a graphics processor, etc.) 801 that may execute various actions and processing according to the program stored in the read-only memory (ROM) 802 or program loaded from a storage 808 to a random access memory (RAM) 803. The RAM 803 also stores various programs and data required for the operation of the terminal device 800. The processing apparatus 801, the ROM 802, and the RAM 803 are connected to each other through a bus 804. An input/output (I/O) interface 805 is also connected to the bus 804.

In general, the following apparatus may be connected to the I/O interface 805: an input apparatus 806 including, for example, a touch screen, a touch pad, a keyboard, a mouse, a camera, a microphone, an accelerometer, a gyroscope and the like; an output apparatus 807 including, for example, a liquid crystal display (LCD), a speaker, a vibration and the like; a storage 808 including, for example, a magnetic tape and a hard disk and the like; and a communication apparatus 809. The communication apparatus 809 may allow the terminal device 800 to communicate wirelessly or wired with other devices to exchange data. Although FIG. 8 illustrates a terminal device 800 having various apparatus, it should be understood it is not required to implement or have all the illustrated apparatuses. Alternatively, it may include more or less apparatuses. In particular, the processes described above with reference to the flowcharts may be implemented as a computer software program according to an embodiment of the present disclosure.

For example, an embodiment of the present disclosure includes a computer program product including a computer program loaded on a computer-readable medium, and the computer program contains program codes for executing the method shown in the flowchart. In such an embodiment, the computer program may be downloaded and installed from the network via the communication apparatus 809, or installed from the storage 808, or installed from the ROM 802. When the computer program is executed by the processing apparatus 801, the above functions defined in the method of the embodiments of the present disclosure are executed.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the above. More specific examples of the computer-readable storage media may include, but are not limited to, electrical connection having one or more wires, portable computer disk, hard disk, random access memory (RAM), read-only memory (ROM), erasable and programmable read-only memory (EPROM or flash memory), optical fiber, portable compact disk read-only memory (CD-ROM), optical storage device, magnetic storage device, or any suitable combination of the above. In the present disclosure, a computer-readable storage medium may be any tangible medium that may contain or store programs, which may be used by or in connection with an instruction execution system, apparatus, or device. In the present disclosure, a computer-readable signal medium may include a data signal that is propagated in the baseband or propagated as part of a carrier, carrying computer-readable program codes. Such propagated data signals may take various forms, which includes, but is not limited to, electromagnetic signals, optical signals, or any suitable combination of the above. The computer-readable signal medium may also be any computer-readable medium except for a computer-readable storage medium, and the computer-readable signal medium may transmit, propagate or transport a program for use by or in connection with an instruction execution system, apparatus or device. Program codes contained on the computer readable medium may be transmitted by any suitable medium, which includes but is not limited to, wire, fiber optic cable, radio frequency (RF), and the like, or any suitable combination of the above.

The above computer readable medium may be contained in the above electronic device, or may be separately present and is not incorporated in the electronic device.

The computer readable medium carries one or more programs, when the one or more programs are executed by the electronic device, causing the electronic device to: display a multimedia playlist on a page, the multimedia playlist including multiple multimedia items; initiate to play the multimedia items in the multimedia playlist according to a preset playing trigger condition; acquire a location jump request; determine a currently playing multimedia item in the multimedia playlist, wherein the currently playing multimedia item is one multimedia item in the multimedia playlist; and jump the page display location to a location of the currently playing multimedia item in the multimedia playlist.

Computer program codes for executing the operations of the present disclosure may be written in one or more programming languages, or combinations thereof, wherein the programming languages includes an object-oriented programming language such as Java, Smalltalk, C++, and also includes conventional procedural programming language—such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

The flowchart and block diagrams in the drawings illustrate the architecture, function, and operation of possible implementations of systems, methods, and computer program products according to various embodiments of the present disclosure. In this regard, each block of the flowchart or block diagram may represent one module, a program segment, or a portion of the codes, and the module, the program segment, or the portion of codes includes one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The modules involved in the described embodiments of the present disclosure can be implemented in software or hardware. Wherein, the name of the module does not constitute a limitation on the module itself under certain circumstances. For example, the display module 10 can also be described as "a module for displaying a multimedia playlist on a page".

The above description is only a preferred embodiment of the present disclosure and a description of the principles of the applied technology. It should be understood by those skilled in the art that the disclosure scope of the present disclosure is not limited to the specific technical solutions of the above technical features, and should also cover other technical solutions formed by the random combination of the above technical features or equivalent features thereof without departing from the above disclosed concept, such as a technique solution in which the above features are replaced with technical features having similar functions disclosed (but is not limited) in the present disclosure.

What is claimed is:

1. A method for jumping a page display location, comprising:
    displaying a multimedia playlist on a page, the multimedia playlist comprising multiple multimedia items;
    initiating to play the multimedia items in the multimedia playlist according to a preset playing trigger condition;
    acquiring a location jump request;
    determining a currently playing multimedia item in the multimedia playlist, wherein the currently playing multimedia item is one of the multimedia items in the multimedia playlist; and
    jumping a display location of the multimedia playlist to a location of the currently playing multimedia item;
    wherein a location jump button is provided on the page and configured to be displayed on the page when a preset trigger operation of the user is detected, wherein the preset trigger operation triggers the currently playing media item to move out of a field of view or an operable range in the multimedia playlist, and
    wherein acquiring the location jump request further comprises: receiving a trigger operation of a user on the location jump button, and generating the location jump request.

2. The method for jumping a page display location according to claim 1, further comprising:
    after initiating to play the multimedia items in the multimedia playlist, tagging a multimedia item initiated to be played as the currently playing multimedia item; and
    determining the currently playing multimedia item in the multimedia playlist further comprises determining the currently playing multimedia item according to whether each multimedia item in the multimedia playlist is tagged.

3. The method for jumping a page display location according to claim 2, wherein tagging the multimedia item initiated to be played further comprises:
    modifying a value of a status tag bit of the multimedia item initiated to be played to tag the multimedia item initiated to be played; or
    recording identification information of the multimedia item initiated to be played to tag the multimedia item initiated to be played.

4. The method for jumping a page display location according to claim 1, further comprising:

setting the location jump button at a fixed location on the page; or adjusting the location jump button according to the display content on the page.

5. The method for jumping a page display location according to claim 4, wherein adjusting the location jump button according to the display content on the page further comprises:

detecting an effective content area of the display content on the page, and setting the location jump button in an area that does not overlap with the effective content area;

detecting the effective content area of the display content on the page, and adjusting a shape of the location jump button so that the location jump button does not overlap with the effective content area; or adjusting a color of the location jump button according to the display content on the page.

6. The method for jumping a page display location according to claim 1, wherein the preset trigger operation comprises one of up-sliding, down-sliding, left-sliding or right-sliding.

7. A terminal device, comprising:

one or more processors; and a memory, configured to store one or more programs that, when executed by the one or more processors, cause the one or more processors to:

displaying a multimedia playlist on a page, the multimedia playlist comprising multiple multimedia items;

initiating to play the multimedia items in the multimedia playlist according to a preset playing trigger condition;

acquiring a location jump request;

determining a currently playing multimedia item in the multimedia playlist, wherein the currently playing multimedia item is one multimedia item in the multimedia playlist; and jumping age a display location of the multimedia playlist to a location of the currently playing multimedia item;

wherein a location jump button is provided on the page and configured to be displayed on the page when a preset trigger operation of the user is detected, wherein the preset trigger operation triggers the currently playing media item to move out of a field of view or an operable range in the multimedia playlist; and wherein acquiring the location jump request further comprises: receiving a trigger operation of a user on the location jump button, and generating the location jump request.

8. A non-transitory computer-readable storage medium storing a computer program thereon that, when executed by a processor, implements a method for jumping a page display location, comprising:

displaying a multimedia playlist on a page, the multimedia playlist comprising multiple multimedia items;

initiating to play the multimedia items in the multimedia playlist according to a preset playing trigger condition;

acquiring a location jump request;

determining a currently playing multimedia item in the multimedia playlist, wherein the currently playing multimedia item is one multimedia item in the multimedia playlist; and jumping age a display location of the multimedia playlist to a location of the currently playing multimedia item;

wherein a location jump button is provided on the page and configured to be displayed on the page when a preset trigger operation of the user is detected, wherein the preset trigger operation triggers the currently playing media item to move out of a field of view or an operable range in the multimedia playlist; and wherein acquiring the location jump request further comprises: receiving a trigger operation of a user on the location jump button, and generating the location jump request.

9. The non-transitory computer-readable storage medium according to claim 8, wherein the method further comprises:

after initiating to play the multimedia items in the multimedia playlist, tagging a multimedia item initiated to be played as the currently playing multimedia item; and determining the currently playing multimedia item in the multimedia playlist further comprises:

determining the currently playing multimedia item according to whether each multimedia item in the multimedia playlist is tagged.

10. The non-transitory computer-readable storage medium according to claim 9, wherein tagging the multimedia item initiated to be played further comprises:

modifying a value of a status tag bit of the multimedia item initiated to be played to tag the multimedia item initiated to be played; or recording identification information of the multimedia item initiated to be played to tag the multimedia item initiated to be played.

11. The non-transitory computer-readable storage medium according to claim 8, wherein the method further comprises:

setting the location jump button at a fixed location on the page; or adjusting the location jump button according to the display content on the page.

12. The non-transitory computer-readable storage medium according to claim 11, wherein adjusting the location jump button according to the displayed content on the page further comprises:

detecting an effective content area of the display content on the page, and setting the location jump button in an area that does not overlap with the effective content area; or detecting the effective content area of the display content on the page, and adjusting a shape of the location jump button so that the location jump button does not overlap with the effective content area; or adjusting a color of the location jump button according to the display content on the page.

13. The non-transitory computer-readable storage medium according to claim 8, wherein the preset trigger operation comprises one of up-sliding, down-sliding, left-sliding or right-sliding.

* * * * *